US011006650B2

(12) United States Patent
Radas et al.

(10) Patent No.: US 11,006,650 B2
(45) Date of Patent: May 18, 2021

(54) METHOD TO PRODUCE CHEESE CHIPS AND RAISED CHEESE CHIPS

(71) Applicant: PAULA Ingredients Spolka z ograniczona odpowiedzialnoscia Spolka Komandytowa, Kalisz (PL)

(72) Inventors: Paulina Radas, Zelazkow (PL); Pawel Radas, Kozminek (PL)

(73) Assignee: PAULA Ingredients Spolka z ograniczona odpowiedzialnoscia Spolka Komandytowa, Kalisz (PL)

( * ) Notice: Subject to any disclaimer, the term of this patent is extended or adjusted under 35 U.S.C. 154(b) by 656 days.

(21) Appl. No.: 15/215,949

(22) Filed: Jul. 21, 2016

(65) Prior Publication Data
US 2017/0020155 A1    Jan. 26, 2017

(30) Foreign Application Priority Data
Jul. 21, 2015   (PL) .......................... 413205

(51) Int. Cl.
| A23C 19/09 | (2006.01) |
| A23C 19/097 | (2006.01) |
| A23C 19/14 | (2006.01) |
| A23C 3/07 | (2006.01) |
| A23C 19/086 | (2006.01) |
| A23C 1/08 | (2006.01) |
| A23L 5/30 | (2016.01) |
| A23P 10/00 | (2016.01) |

(52) U.S. Cl.
CPC ............ *A23C 19/0925* (2013.01); *A23C 1/08* (2013.01); *A23C 3/07* (2013.01); *A23C 19/086* (2013.01); *A23C 19/0912* (2013.01); *A23C 19/0921* (2013.01); *A23C 19/0976* (2013.01); *A23C 19/14* (2013.01); *A23L 5/34* (2016.08); *A23P 10/00* (2016.08); *A23C 2250/10* (2013.01); *A23V 2002/00* (2013.01); *A23V 2300/00* (2013.01)

(58) Field of Classification Search
CPC . A23C 19/09; A23C 19/0912; A23C 19/0925; A23C 19/14; A23C 19/086; A23C 19/097; A23C 2210/05; A23C 2250/10; A23C 1/08; A23C 3/07; A23C 19/0908; A23C 19/0976; A23L 5/00; A23L 5/15; A23L 5/17; A23L 5/34; A23L 3/01; A23L 3/36; A23L 3/365; A23L 3/361; A23L 3/362; A23L 3/363; A23L 3/364; A23L 3/44; A23L 3/54; A23P 10/00; A23P 30/30; A23P 30/38; A23V 2300/10
See application file for complete search history.

(56) References Cited

U.S. PATENT DOCUMENTS

| 4,803,090 A * | 2/1989 | Schlipalius .......... A23C 19/084 426/242 |
| 4,960,605 A | 10/1990 | Trecker et al. |
| 5,795,613 A * | 8/1998 | Scharfmann ........... A23C 19/06 426/237 |
| 7,521,078 B2 * | 4/2009 | Miller ................ A23C 19/0912 426/443 |
| 8,119,177 B2 * | 2/2012 | Prestini .............. A23C 19/0912 426/242 |
| 2005/0031758 A1 * | 2/2005 | Scharfman ........... A23C 19/086 426/582 |
| 2006/0083842 A1 | 4/2006 | Miller |
| 2008/0179318 A1 | 7/2008 | Cornwell |
| 2010/0104726 A1 * | 4/2010 | Richardson ......... A23C 19/086 426/582 |
| 2013/0004632 A1 * | 1/2013 | Caroe ................. A23C 19/082 426/302 |
| 2013/0164429 A1 * | 6/2013 | Stromotich ........ A23C 19/0912 426/582 |
| 2015/0173385 A1 * | 6/2015 | Oustric ................. A23C 19/09 426/582 |

FOREIGN PATENT DOCUMENTS

| JP | 3083540 B2 | 9/2000 |
| PL | 396326 A1 | 3/2013 |
| RU | 2489890 C1 | 8/2013 |
| WO | WO-03061394 A1 * | 7/2003 ......... A23C 19/0912 |
| WO | WO-2013039410 A1 | 3/2013 |

OTHER PUBLICATIONS

Mounir, Sabah et al., "Characterization of pure cheese snacks and expanded granule powders textured by the instant controlled pressure drop (DIC) process," *Dairy Sci. & Technol.* (2011) 91:441-455.

* cited by examiner

*Primary Examiner* — Drew E Becker
*Assistant Examiner* — Bryan Kim
(74) *Attorney, Agent, or Firm* — Dinsmore & Shohl LLP

(57) ABSTRACT

A method to produce cheese chips provides that cut cheese slices are frozen and then raised by means of rapid water evaporation due to the application of microwave and vacuum drying. The freezing step is preceded by drying and cooling, and the raised cheese chips containing cheese and flavourings are characterised in that their density does not exceed 0.46 g/cm$^3$, the porosity does exceed 40%, and the crunchiness does exceed 4.

13 Claims, No Drawings

METHOD TO PRODUCE CHEESE CHIPS AND RAISED CHEESE CHIPS

CROSS-REFERENCE TO RELATED APPLICATIONS

This application claims priority of Polish Patent Application P. 413 205 filed Jul. 21, 2015.

FIELD OF THE INVENTION

The object of the invention is a method to produce cheese chips and raised cheese chips, applicable in the food industry.

BACKGROUND

The method to produce cheese chips known from Polish patent application No. P.396326. consists in checking the cheese with a metal detector, slicing it with a slicer to the thickness of 1 mm to 7 mm, and checking it with an optical detector for foreign bodies after which the cheese slices are frozen to the temperature of minus 5° C. to minus 30° C. by blowing cool air with a temperature of minus 20° C. to minus 150° C. for 5 to 40 minutes. The frozen cheese slices are raised by rapid water evaporation resulting in the occurrence of characteristic smaller and/or larger air pockets increasing the volume of the products, raising being carried out in a microwave and vacuum drier for 1 to 20 minutes at the pressure of 15 to 100 hPa and with the supplied microwave power of 5 to 120 kW. After raising, the cheese slices are mixed with a topping, and then the slices are finally dried at a temperature of 20° C. to 65° C. for 0.5 to 2 hours to a humidity of 1 to 9% providing the crunchiness effects, and after the additional drying, the cheese slices are sifted on a sieve screen and the accepted fraction is bagged.

The method to produce extruded chips, containing cheese grains, known from Russian patent specification No. RU2312521, consists in mixing ground Cheddar cheese in the amount of 15% and particle size in the range of 0.32 mm to 0.63 mm with rice in the amount of 85% by weight after which the mixture is moisturized to 15-18% and processed in an extruder at a temperature of 150-160° C. and a pressure of 7.5-8.5 MPa, and the surface of the resulting extruded product is sprinkled with vitamins containing salt in the amount of 2.5% of the cheese chips weight. According to another version, Cheddar cheese in the amount of 10% is mixed with wheat in the amount of 90% by weight or a dry Cheddar cheese mixture in the amount of 20% by weight is mixed with 80% by weight of triticale.

The method to produce a food product, coextruder to produce a food product and the food product, known from Polish patent specification No. PL203664, is obtained with the use of cheese pastes containing a large amount of dry mass, in particular 50-60%. In the case of known systems for coextrusion, the shear forces present at the coextruding nozzle are too high for obtaining a well formed product. A method to produce a food product consisting of a solid shell surrounding at least one filling, with the application of a base food product to form the product shell and at least one food product constituting the filling, is performed in a coextruder comprising a coextruding nozzle, fed with the base food product and at least one filling material, characterized in that it is implemented with the application of two-section coextruding nozzle, wherein the solid shell is formed at the first step implemented in the first section of the said nozzle, solidified by cooling of the base food product, and then the said solid formed shell is filled in the second step implemented in the second section of the said nozzle with at least one filling material, resulting in finished product consisting of a shell filled with the said at least one filling material, and the said finished product is collected. The basic food ingredient is usually a protein ingredient, but it may also be polysaccharide. Cooling of the shell is carried out using water or a similar liquid circuit. Natural cheese, fresh milk curd or unprocessed cheese products, processed cheese or processed cheese products with homogenising salts or without homogenising salts can be used as the shell material. The filling and the shell are made at a temperature of about 90° C. in feeding hoppers, the filling is cooled to the temperature of about 80° C. and the shell is cooled to the temperature of about 60° C. between the feeding hoppers and the co-extruding die; the shell is extruded and cooled to the temperature of about 50° C. to solidify the shell in the first nozzle section; the filling to fill the shell produced in the first section is extruded and cooled to the temperature of about 30° C. in the second nozzle section, the product leaving the nozzle having the temperature of about 38° C.

From Polish patent application No. PL396326, a method to produce cheese chips is known, consisting in checking the cheese with a metal detector, then slicing it with a slicer to a thickness of 1 mm to 7 mm, and checking if it does not contain foreign bodies, after which the cheese slices undergo a freezing process in a cool air stream with a temperature below minus 20 to minus 100° C. for 5 to 40 minutes. The frozen cheese slices are raised by rapid water evaporation resulting in the appearance of characteristic smaller and/or larger air pockets increasing the volume of the product, wherein the raising is carried out in a microwave and vacuum drier for 1 min to 20 mins at a pressure of 15 to 100 hPa. Products obtained with the above described method did not have an appropriate texture and crunchiness. A snack obtained from various kinds of cheese, including e.g. Gouda type and other matured cheeses was less crunchy. Therefore, a method to produce cheese snacks that can be obtained from any type of cheese, including e.g. Gouda and other matured cheeses, wherein the obtained product is characterized with appropriate crunchiness, porosity, and density all over its volume, is still being sought. Unexpectedly, the problems mentioned above have been solved by the present invention.

SUMMARY OF THE INVENTION

The first object of the present invention is a method to produce cheese chips consisting in that cheese slices are frozen and then raised by rapid water evaporation due to the application of microwave and vacuum drying, characterized in that the freezing step is preceded by drying and cooling. An equally preferable method according to the present invention is characterized in that the cheese slices are pre-dried at a temperature from 20° C. to 90° C. for 30 minutes to 200 minutes until reaching a humidity of 10% to 50% followed by cooling with air having a temperature of about 15° C. More preferably, the method according to the present invention is characterised in that the cheese is checked with a metal detector prior to slicing, then sliced with a slicer to a thickness of 1 mm to 7 mm in length and 10-80 mm in width, and checked if it does not contain any foreign bodies, after which the cheese slices undergo a freezing process in a cold air stream with a temperature below minus 20° C. for 5 to 40 minutes. In another, equally preferable embodiment of the present invention, the method is characterized in that the raising step is carried out in a microwave and vacuum drier for 1 min to 20 mins at a pressure of 15 to 100 hPa. In another embodiment of the present invention, the method is characterized in that the cheese slices are finally dried to a humidity level below 9% producing the crunchiness effect, and then the cheese slices are screened on a screening sieve and the accepted fraction is bagged. More preferably, the method according to the present invention is characterised by that the pre-dried cheese flakes are frozen to a temperature of minus 5° C. to minus 50° C. in a cold air stream having a temperature of minus 20° C. to minus 150° C., after which raising is carried out in a microwave and vacuum drier for 1 min to 20 mins at a pressure of 15 to 100 hPa to a humidity of 0.2% to 9%. Even more preferably, the method according to the present invention is characterized by that the raised cheese slices are mixed with a topping and then the slices are finally dried at a temperature of 20° C. to 65° C. for 0.5 to 2 hours, preferably, cut cheese slices are soaked in a vinaigrette solution for 2 to 40 minutes. In another convenient embodiment of the present invention, the method is characterised in that the vinaigrette solution contains wine vinegar in an amount of 60%-93%, dried yeast extract in an amount of 0.1% to 20%, citric acid in an amount of 0.1% to 15%, pepper extract in an amount of 0.1%-15% and dried garlic concentrate in an amount of 0.1%-15% that are dissolved in water at a temperature of 15-25° C. to the concentration of 1%-30%. In another preferable embodiment of the present invention, the method is characterised in that the cut cheese slices are soaked in a garlic solution for 5-30 minutes, wherein the garlic solution preferably contains garlic extract in the amount of 35-55%, ground garlic in the amount of 0.1% to 25%, sea salt in the amount of 5%-32%, citric acid in the amount of 0.1% to 15% and parsley in the amount of 0.1% to 15% that are dissolved in water at a temperature of 15-25° C. to a concentration of 1-30%. Equally preferably, the method according to the present invention is characterised in that the cheese slices are mixed with a pizza flavour topping in the amount of 2% to 30% of the product weight, wherein the pizza flavour topping preferably contains ground dried tomato in the amount of 40%-60%, dried paprika and/or paprika flavour in the amount of 2.25% to 27.6%, pepper extract in the amount of 0.1%-15%, sea salt in the amount of 10%-30%, dried onion concentrate in amount of 2%-22%, anhydrous citric acid in the amount of 0.1%-15%, ground oregano in the amount of 0.1%-20%, and fine basil in the amount of 0.1%-20%. Most preferably, the method according to the present invention is characterised in that the raised cheese slices are mixed with a paprika topping in the amount of 1%-30% by the weight of the product, wherein the paprika topping preferably contains dried paprika and/or paprika flavour in the amount of 50%-99.8%, pepper extract in the amount of 0.1% to 25%, and ground oregano in the amount of 0.1% to 25%. A method according to the present invention is characterised in that the cheese slices are screened on a sieve screen with square mesh, wherein the mesh size is 10 mm or 15 mm.

The second object of the present invention is raised cheese chips containing cheese and possibly containing flavour additives. Cheese chips are characterised in that their density does not exceed 0.46 g/cm³. More preferably, cheese chips according to the present invention are characterised in that their porosity measured by analyzing the displacement of sea sand is at least 40%. Most preferably, cheese chips according to the present invention are characterised in that the crunchiness is obtained at a level of at least 4 of microcracks in the process of destroying chip cheese as determined by penetrometer testing.

DETAILED DESCRIPTION OF THE PREFERRED EMBODIMENTS

The advantage of chips made of cheese is that their taste is comparable to the taste of cheese, but at the same time they are also a great snack. They are produced solely from natural cheese, and after drying they have natural appearance and colour, and a pleasant and crunchy texture. The drying method provides a high content of aromatic compounds, minerals and vitamins. Cheese chips are a perfect alternative for unhealthy and fattening potato snacks. The method to produce cheese chips according to the present invention allows obtaining healthy and tasty chips that are addressed to children, youth, and adults.

The object of the present invention has been explained in exemplary embodiments.

EXAMPLE 1

The method to produce cheese chips consists in that the delivered cheese is weighted and recorded in the production report, and then cleaned and thoroughly rinsed with a water stream, and passed through a metal detector in order to eliminate possible impurities. The cheese is then cooled and frozen. Such prepared cheese is sliced into slices 7 mm thick, wherein while feeding the cheese to the slicer, the material is fed in a substantially uniform way in order to evenly load the slicing chamber. The cut slices are pre-dried at a temperature of 20° C. for 200 minutes to reach 10% humidity, after which they are cooled with air at a temperature of about 15° C., and the pre-dried cheese flakes are frozen to a temperature from minus 5° C. in a cold air stream at a temperature from minus 20° C. The cut cheese slices are then pre-frozen in a fluidize bed tunnel. The pre-freezing is carried out at a temperature of minus 80° C. for 25 minutes. The pre-frozen cheese slices are mixed with a paprika topping in the amount of 30% by product weight that contains dried paprika and paprika flavour in the amount of 50%, pepper extract in the amount of 25%, and ground oregano in the amount of 25%. The spiced and pre-frozen slices in the amount of 3 kg are raised by rapid water evaporation resulting in the occurrence of characteristic smaller and larger air pockets increasing the volume of the product. The raising is carried out in a microwave and vacuum drier for 10 mins at a pressure of 25 hPa and a supplied microwave power of 24 kW, after which the slices are finally dried at a temperature of 65° C. for 1 hour to a humidity level of 7% producing the crunchiness effect. After the final drying, the slices are screened on a sieve screen with a square mesh of 15 mm. The accepted fraction is bagged into aluminium Triplex 60×40 bags of 2 kg. Such prepared bags are labelled and packed in cartons of 3 pieces each. The finished product is stored in the storehouse on a pallet with 24 stacked cartons protected with stretch foil. Cheese chips are characterised in that their density is 0.188 g/cm³, their porosity measured by analyzing the displacement of sea sand is 74.3%, their crunchiness is 9.5 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 2

In example 2, a method to produce cheese chips runs as in Example 1, except that the cheese is sliced on a URSCHELL slicer into slices 4 mm thick, and the slices are frozen in a freezing tunnel at a temperature of minus 40 degrees for 20 minutes. The cut slices are pre-dried at a temperature of 90° C. for 30 minutes to reach 50% humidity, after which they are cooled with air at a temperature of about 15° C., and the pre-dried cheese flakes are frozen to a temperature from minus 50° C. in a cold air stream at a temperature from minus 100° C. The pre-frozen cheese slices are mixed with a paprika topping in the amount of 1% by product weight that contains dried paprika in the amount of 99.8%, pepper extract in the amount of 0.1%, and ground oregano in the amount of 0.1%. The spiced and pre-dried slices weighing 8 kg are then raised in a microwave and vacuum drier for 2 mins, at a pressure of 25 hPa and with a supplied microwave power of 100 kW. After that the slices are finally dried at a temperature of 40° C. for 4 hours to a humidity level of 4% producing the crunchiness effect, and the finally dried flakes are screened on a sieve screen with a square mesh of 10 mm, and bagged. The flavour of the individual flakes is different, which is connected with the amount of topping deposited on the flakes during mixing. Cheese chips are characterised in that their density is 0.392 g/cm$^3$, their porosity measured by analyzing the displacement of sea sand is 53.8%, their crunchiness is 8.5 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 3

In example 3, a method to produce cheese chips runs as in Example 1 or Example 2, except that the cheese slices are soaked in a 30% water solution of garlic flavouring at a temperature of 25° C. for 5 minutes, wherein the garlic flavouring contains garlic extract in the amount of 55%, ground garlic in the amount of 25%, sea salt in the amount of 5%, citric acid in the amount of 5% and parsley in the amount of 15%. Next, the flavoured slices are frozen in a freezing tunnel at a temperature of minus 120 degrees for 10 minutes, and then they are raised by rapid water evaporation resulting in occurrence of characteristic smaller and larger air pockets increasing the volume of the product. The raising is carried out in a microwave and vacuum drier for 7 mins at a pressure of 70 hPa and a supplied microwave power of 70 kW, after which the slices are finally dried at a temperature of 25° C. for 2 hours to a humidity level below 4% producing the crunchiness effect. Cheese chips are characterised in that their density is 0.207 g/cm$^3$, their porosity measured by analyzing the displacement of sea sand is 68%, their crunchiness is 8.1 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 4

In example 4, a method to produce cheese chips runs as in Example 1 or Example 2, except that the cheese is sliced on a URSCHELL slicer into slices 2 mm thick, the slices are cooled with a cold air stream at a temperature of about minus 150° C. After the cooling process, the slices are soaked in a 1% water solution of garlic flavouring at a temperature of +1° C. for 30 minutes, wherein the garlic flavouring contains garlic extract in the amount of 35%, ground garlic in the amount of 3%, sea salt in the amount of 32%, citric acid in the amount of 15% and parsley in the amount of 15%. Next, the flavoured cheese slices are raised by rapid water evaporation resulting in the occurrence of characteristic smaller and larger air pockets increasing the volume of the products, raising being carried out in a microwave and vacuum drier for 6 mins at a pressure of 25 hPa and with a supplied microwave power of 20 kW. The raised slices are finally dried at a temperature of 40° C. for 2 hours to a humidity level below 4% producing the crunchiness effect. After the final drying, the flakes are screened on a sieve screen with a square mesh of 10 mm. Cheese chips are characterised in that their density is 0.401 g/cm$^3$, their porosity measured by analyzing the displacement of sea sand is 51.2%, their crunchiness is 7.9 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 5

In example 5, a method to produce cheese chips runs as in Example 1 or Example 2, except that the cheese is sliced on a slicer into slices 5 mm thick, the slices are cooled with a cold air stream at a temperature of about minus 150° C. Next, the cooled cheese slices are soaked in a 30% water solution of a vinaigrette mixture at a temperature of 2° C. for 15 minutes, wherein the vinaigrette mixture contains wine vinegar in an amount of 60%, dried yeast extract in the amount of 20%, citric acid in the amount of 5%, pepper extract in the amount of 5%, and dried garlic concentrate in the amount of 10%. Then, spiced flakes are raised by rapid water evaporation resulting in the occurrence of characteristic smaller and larger air pockets increasing the volume of the product. The raising is carried out in a microwave and vacuum drier for 10 mins at a pressure of 40 hPa and a supplied microwave power of 48 kW, after which the slices are finally dried at a temperature of 65° C. for 0.5 hours to a humidity level of 3% producing the crunchiness effect. All chips have a uniform flavour since the solution is absorbed better inside the tissue. Cheese chips are characterised in that their density is 0.212 g/cm$^3$, their porosity measured by analyzing the displacement of sea sand is 71%, their crunchiness is 11.2 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 6

In example 6, a method to produce cheese chips runs as in Example 1 or Example 2, except that the cheese is sliced on a slicer into slices 1 mm thick, the cheese slices are soaked in a 20% water solution of a vinaigrette mixture containing wine vinegar in the amount of 93%, dried yeast extract in the amount of 1%, citric acid in the amount of 1.1%, pepper extract in the amount of 0.9%, and dried garlic extract in the amount of 4%. Then, the spiced slices are frozen in a freeze tunnel at a temperature of 150° C. for 10 minutes, and raised by rapid water evaporation resulting in occurrence of characteristic air pockets increasing the volume of the product, wherein the raising is carried out in a microwave and vacuum drier for 5 mins at a pressure of 25 hPa and with a supplied microwave power of 28 kW. The raised slices are finally dried at a temperature of 45° C. for 2 hours to a humidity level below 6% producing the crunchiness effect. After the final drying, the flakes are screened on a sieve screen with a square mesh of 15 mm. Cheese chips are characterised in that their density is 0.449 g/cm$^3$, their porosity measured by analyzing the displacement of sea sand is 45%, their crunchiness is 5.8 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 7

In example 7, a method to produce cheese chips runs as in Example 1 or Example 2, except that the cheese having been delivered to the production facility is checked with a metal detector for possible metal content, and then it is sliced on a slicer into slices 1-7 mm and checked in an optical detector for foreign bodies. Cheese slices are transported to the freeze tunnel and frozen to a temperature of minus 5° C. by a cold air stream at a temperature of minus 70° C. for 15 minutes. Then, the cheese slices in an amount of 8 kg are raised by rapid water evaporation resulting in the occurrence of characteristic smaller and larger air pockets increasing the volume of the product. The raising is carried out in a microwave and vacuum drier for 10 mins at a pressure of 70 hPa and a supplied microwave power of 52 kW, and after raising the cheese slices are mixed with a pizza flavour topping in the amount of 10% by the product weight, containing ground dried tomato in the amount of 50%, dried paprika and paprika flavour in the amount of 10%, pepper extract in the amount of 3%, sea salt in the amount of 10%, dried onion concentrate in the amount of 6%, anhydrous citric acid in the amount of 5%, ground oregano in the amount of 7%, and fine basil in the amount of 9%, after which the flakes are finally dried at a temperature of 65° C. for 2 hours to a humidity level of 2% producing the crunchiness effect. After the final drying, the slices are screened on a sieve screen with a square mesh of 15 mm. The accepted fraction is bagged into aluminium Triplex 60×40 bags of 2 kg. Such prepared bags are labelled and packed in cartons of 3 pieces each. The finished product is stored in the storehouse on a pallet with 24 stacked cartons protected with stretch foil. Cheese chips are characterised in that their density is 0.217 g/cm$^3$, their porosity measured by analyzing the displacement of sea sand is 70%, their crunchiness is 11.7 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 8

In example 8, a method to produce cheese chips runs as in Example 7, except that the cheese is sliced into slices 1 mm thick and checked on an optical detector for foreign bodies. Cheese slices are transported to the freeze tunnel and frozen to a temperature of minus 15° C. by cold air stream at a temperature of minus 120° C. for 10 minutes. The frozen cheese slices are mixed with a pizza flavour topping in the amount of 10% of the product weight, containing ground dried tomato in the amount of 60%, dried paprika in the amount of 4%, pepper extract in the amount of 2%, sea salt in the amount of 30%, dried onion concentrate in the amount of 2%, anhydrous citric acid in the amount of 1%, ground oregano in the amount of 0.2%, and fine basil in the amount of 0.8%. The spiced slices are raised in a microwave and vacuum drier for 5 mins, at a pressure of 17 hPa and with a supplied microwave power of 14 kW. After that the slices are finally dried at a temperature of 60° C. for 2 hours to a humidity level of 3% producing the crunchiness effect, and the finally dried slices are screened on a sieve screen with a square mesh of 15 mm, and bagged.

Cheese chips are characterised with high crispness and crunchiness, resulting from the fact that the tissue of dried cheese slices is raised by means of air pockets by rapid volume water evaporation, increasing the volume of the product whose surface is covered with smaller and/or larger crispy air pockets. Such texture makes the cheese chips light and delicate, with crispness comparable with that of potato, carrot, beetroot, tomato, and topinambour chips. The percentage selection of components and additives in the embodiments is only an attempt at showing the possibilities offered by the application of cheese to produce cheese chips that can be made without salt as well as with hot and sweet flavours, and solely due to the known flavour preferences of the customers only typical product flavours have been presented. Cheese chips are characterised in that their density is 0.453 g/cm$^3$, their porosity measured by analyzing the displacement of sea sand is 44.1%, their crunchiness is 6 of microcracks in the process of destroying chip cheese as determined by penetrometer testing. The greater the amount of local cracks, which stimulates the process of biting the sample, the longer it takes to pick up noise events to generate a better impression of crispness.

EXAMPLE 9

In example 9, cheese chips were prepared according to the method disclosed in patent application No. PL396326 and according to Example 1. Cheese chips were characterised by higher density at level 0.726 g/cm$^3$, lower porosity at level 9.09% and worse crunchiness where microcracks in the process of destroying chip cheese as determined by penetrometer testing were at the level 1.5.

The invention claimed is:
1. A method to produce cheese chips from matured cheese, comprising the steps of:
   providing cheese slices from the matured cheese, the cheese slices having a thickness in the range of 1 mm to 7 mm;
   drying the cheese slices at a temperature from 20° C. to 90° C. for 30 minutes to 200 minutes until reaching a humidity level of 10% to 50%;
   after the drying step, cooling the cheese slices with air;
   freezing the cheese slices after the drying and cooling steps; and
   raising the cheese slices by water evaporation by application of microwave and vacuum drying until the cheese slices have a density not exceeding 0.46 g/cm$^3$;
   thereby providing cheese chips from matured cheese having a density not exceeding 0.46 g/cm$^3$ and a porosity measured by analyzing a displacement of sea sand that is at least 40%.

2. The method according to claim 1, wherein:
   the providing cheese slices step comprises:
      checking the matured cheese with a metal detector; and
      after checking the matured cheese with the metal detector, slicing the matured cheese with a slicer into slices in the range of 10-80 mm long;
   the method further comprising checking the cheese slices for any foreign bodies;

the freezing step comprising disposing the cheese slices in a cold air stream having a temperature below minus 20° C. for 5 to 40 minutes.

3. The method according to claim 1, wherein:
the raising step is carried out in a microwave and vacuum drier for 1 min to 20 mins at a pressure of 15 to 100 hPa.

4. The method according to claim 1, wherein:
the cheese chips are dried to a humidity level below 9% by the vacuum drying thereby producing a crunchiness effect; and
the dried cheese chips are screened on a sieve screen and an accepted fraction is bagged.

5. The method according to claim 1, wherein:
the freezing step comprises freezing the cheese slices to a temperature of minus 5° C. to minus 50° C. in a cold air stream having a temperature of minus 20° C. to minus 150° C.; and
the raising step comprises raising the cheese slices is carried out in a microwave and vacuum drier for 1 min to 20 mins at a pressure of 15 to 100 hPa to a humidity of 0.2% to 9%.

6. The method according to claim 1, further comprising:
mixing the raised cheese slices with a topping; and then finally drying the cheese slices at a temperature of 20° C. to 65° C. for 0.5 to 2 hours.

7. The method according to claim 6, further comprising soaking the cheese slices a vinaigrette solution for 2 to 40 minutes.

8. The method according to claim 7, wherein:
the vinaigrette solution contains wine vinegar in an amount of 60% to 93%, dried yeast extract in an amount of 0.1% to 20%, citric acid in an amount of 0.1% to 15%, pepper extract in an amount of 0.1% to 15% and dried garlic concentrate in an amount of 0.1% to 15%, the solution being diluted with water at a temperature of 15° C. to 25° C. to a concentration of 1% to 30%.

9. The method according to claim 1, further comprising:
soaking the cheese slices in a garlic solution for 5 to 30 minutes, wherein the garlic solution contains garlic extract in an amount of 35% to 55%, ground garlic in an amount of 0.1% to 25%, sea salt in an amount of 5% to 32%, citric acid in an amount of 0.1% to 15% and parsley in an amount of 0.1% to 15%, the solution being diluted with water at a temperature of 15° C. to 25° C. to a concentration of 1% to 30%.

10. The method according to claim 1, further comprising:
mixing the cheese slices with a pizza flavour topping in an amount of 2% to 30% by product weight, wherein the pizza flavour topping contains ground dried tomato in an amount of 40% to 60%, dried paprika and/or paprika flavour in an amount of 2.25% to 27.6%, pepper extract in an amount of 0.1% to 15%, sea salt in an amount of 10% to 30%, dried onion concentrate in an amount of 2% to 22%, anhydrous citric acid in an amount of 0.1% to 15%, ground oregano in an amount of 0.1% to 20%, and basil in an amount of 0.1% to 20%.

11. The method according to claim 1, further comprising:
mixing the raised cheese slices with a paprika topping in an amount of 1% to 30% by weight of the raised cheese slices with the paprika topping, wherein the paprika topping contains dried paprika and/or paprika flavour in an amount of 50% to 99.8%, pepper extract in an amount of 0.1% to 25%, and ground oregano in an amount of 0.1% to 25%.

12. The method according to claim 1, further comprising:
screening the cheese slices on a sieve screen with square mesh having a mesh size of 10 mm or 15 mm.

13. The method according to claim 1, wherein:
the cooling with air step comprises cooling with air having a temperature of 15° C.

\* \* \* \* \*